United States Patent [19]

Miyajima et al.

[11] Patent Number: 4,974,696

[45] Date of Patent: Dec. 4, 1990

[54] POWER TRANSMISSION DEVICE FOR FOUR WHEEL DRIVE VEHICLES

[75] Inventors: Shin Miyajima, Anjo; Takenori Kano, Anjo; Fumitomo Yokoyama, Anjo; Yasunari Nakamura, Nagoya; Masaharu Tanaka, Toyota; Koujiro Kuramochi, Okazaki, all of Japan

[73] Assignees: Aisin AW Co., Ltd., Anjo; Toyota Jidosha Kabushiki Kaisha, Toyota, both of Japan

[21] Appl. No.: 250,297

[22] Filed: Sep. 28, 1988

[30] Foreign Application Priority Data

Sep. 29, 1987 [JP] Japan ............................ 62-245307

[51] Int. Cl.$^5$ .......................... B60K 17/34; F16H 1/44
[52] U.S. Cl. .................................... 180/248; 74/695; 74/711
[58] Field of Search ............... 180/248, 249, 247, 233; 74/467, 711, 701, 705, 695

[56] References Cited

U.S. PATENT DOCUMENTS

| | | | |
|---|---|---|---|
| 4,445,400 | 5/1984 | Sullivan et al. | 74/711 |
| 4,644,823 | 2/1987 | Mueller | 180/248 X |
| 4,708,032 | 11/1987 | Harada et al. | 180/247 X |
| 4,739,678 | 4/1988 | Miura et al. | 180/248 X |
| 4,745,819 | 5/1988 | Kano et al. | 74/701 |
| 4,763,748 | 8/1988 | Miura et al. | 180/248 |
| 4,790,211 | 12/1988 | Iwatsuki et al. | 74/711 X |
| 4,805,721 | 2/1989 | Takahashi et al. | 180/248 |
| 4,821,604 | 4/1989 | Asano | 180/248 X |
| 4,836,322 | 6/1989 | Sakakiyama | 180/248 X |
| 4,867,262 | 9/1989 | Takada et al. | 180/249 |

FOREIGN PATENT DOCUMENTS 2140104 11/1984 United Kingdom .
2172863 10/1986 United Kingdom .

Primary Examiner—Mitchell J. Hill
Attorney, Agent, or Firm—Kanesaka and Takeuchi

[57] ABSTRACT

A differential motion limiting device, for a power transmission device for four wheel drive vehicle, to regulate differential motion of a center differential device includes a wet-type multi plate clutch and an hydraulic actuator. And a switching valve is attached to an oil passage to the hydraulic actuator. In normal running condition, a switching valve is in connecting condition, and a hydraulic pressure being varied by driving conditions is applied to a hydraulic actuator. Under this condition, the clutch is slippingly engaged by certain engaging force so that torque, per certain ratio, is transmitted to the front and the rear wheels. In high speed condition, such as the maximum speed state like an overdrive, or a vehicle speed more than 100 km/h, sensors detect such state, then the switching valve is switched, and the clutch is released. As a result, lubrication oil is flowed between friction plates and separators of the clutch to release heat therefrom.

9 Claims, 7 Drawing Sheets

POWER TRANSMISSION DEVICE FOR FOUR WHEEL DRIVE VEHICLES

BACKGROUND OF THE INVENTION

The present invention relates to a power transmission device for four wheel drive vehicle mounted on an automobile, particulary to the device distributing torque to front and rear wheels by a wet type frictional clutch engaging due to certain engaging force proportional to oil pressure.

DESCRIPTION OF THE PRIOR ART

In a power transmission device for four wheel drive vehicle, in general, in case the device is a part-time system, operation to switch from two wheel driving condition to four wheel driving condition or vice versa is required, and in case the device is a full-time system, operation to work or release a center differential is necessary, so the driver is required to master complicated driving skills corresponding to the road conditions to do the above operations.

Then a power transmission device for four wheel drive vehicle with wet-type frictional clutch system and a traction control system both of which require no operations mentioned above are proposed.

For a wet-type frictional clutch system, an automatic transmission and a part-time system power transmission device for four wheel drive vehicle, for example a power transmission device for four wheel drive vehicle based on front wheel drive, are coupled, and power is transmitted to rear wheels through a wet-type frictional clutch engaged by line pressure produced from an automatic transmission, so that rotational difference of the front and rear wheels is absorbed when cornering by slipping the clutch.

For a traction control system, a hydraulic clutch and a center differential are coupled, wherein in normal running condition, the device drives as two wheel drive vehicle such as a front-engine-rear-drive, and in case of the rear wheels (driving wheel) being turned without load, the center differential is connected by a hydraulic clutch by judgement of a computer, by which 35% torque is distributed to the front wheel. In in case idle turning of wheels is still observed, the center differential becomes direct coupling condition, and the torque is distributed evenly to the front wheels (50%) and the rear wheels (50%).

The above traction control system requires a sophisticated computer to monitor the turning speed of wheels, the control is quite intricate and the device itself is expensive.

In the above wet-type frictional clutch system, the structure is quite simple because only line pressure is applied to the clutch. However the clutch is constantly engaged in slipping condition, so reliability on heat resistance is not sufficient.

The power transmission device for four wheel drive vehicle of wet-type frictional clutch system mainly drives front wheels and transmits power to rear wheels through the wet-type frictional clutch. Accordingly under four wheel drive condition, an engaging force capable of withstanding torque transmitted is provided, and comparatively high hydraulic pressure is constantly required, while comparatively low hydraulic pressure based on the above comparatively high hydraulic pressure is provided when low speed running, such as tight-cornering. The wet-type frictional clutch of this type allows its slips on the basis of the direct coupling of the front and rear wheels, so large capacity of the clutch is inevitably required. Consequently, slip between the road and the wheels may possibly be developed, fuel efficiency may deteriorate, tires are worn comparatively early, and rotational difference between the front and rear wheels is not sufficiently absorbed at tight-cornering because of the clutch hydraulic pressure not being lowered enoughly.

The applicant of the present invention proposed the power transmission device for four wheel drive vehicle, at the same time of this application, wherein the line pressure or the hydraulic pressure lowered per certain ratio is applied to the hydraulic actuator of differential motion limiting device of the center differential; the multi plates clutch is engaged with certain engaging force; the rotational differences of the front and rear wheels are absorbed by the slip of the multi plates clutch; and torque is distributed to both front and rear wheels by the center differential. The clutch of this type has the same problem as in the one mentioned in wet-type frictional clutch on part-time system, i.e. there is possibly no reliability for heat resistance on frictional plates.

SUMMARY OF THE INVENTION

The present invention is purposed to provide a power transmission device for four wheel drive vehicle which is made up by inexpensive devices, and in which heat developed from the friction plates of the clutch is released.

Figure 1:
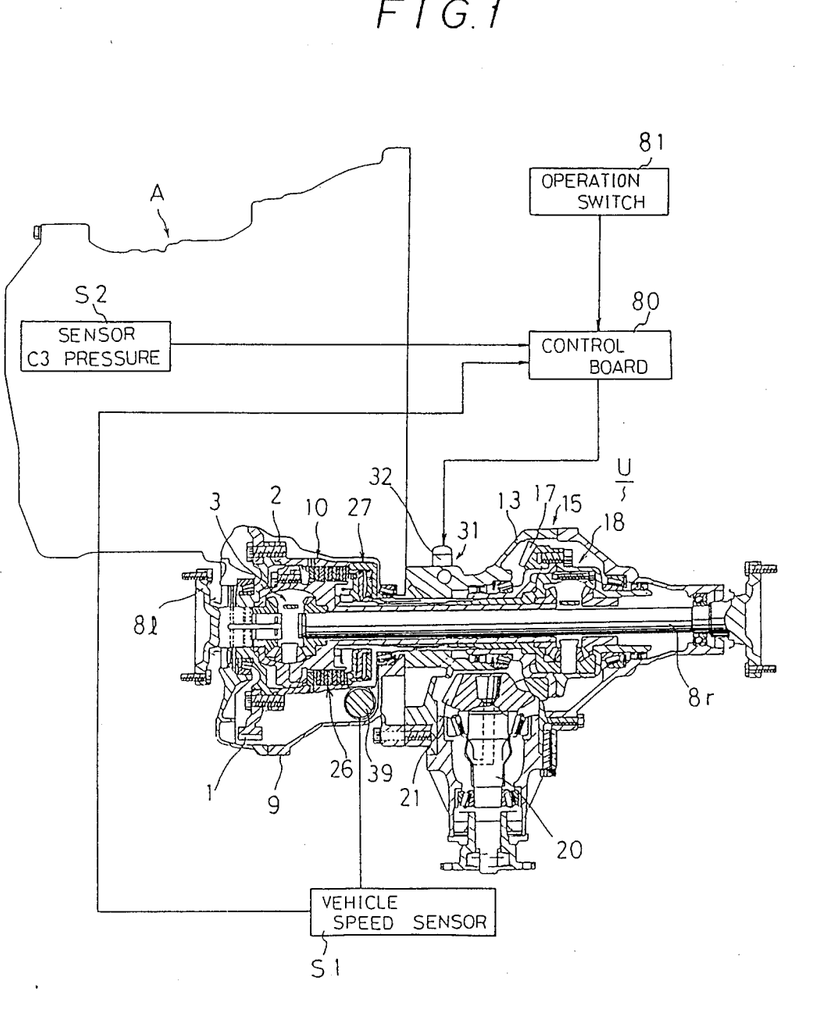
FIG. 1 is a side view including partial cross sectional view of a power transmission device for four wheel drive vehicle of the present invention.

The present invention is explained along with FIG. 1.

In a power transmission device for four wheel drive vehicle (U) transmitting torque from an automatic transmission (A) to both front and rear wheels, a differential motion limiting device (10) of a center differential (18) having a wet-type frictional clutch (26) and a hydraulic actuator (27) is installed, and a switching valve (33) is placed in an oil passage to the actuator (27). And under normal running condition, hydraulic pressure based on a line pressure is applied to the hydraulic actuator (27), and the friction clutch (26) is engaged by certain engaging force. Further sensors (S1) and (S2) are installed to monitor high speed of the vehicle, and by detecting high speed state, the friction clutch (26) is released during certain period of time by switching the switching valve (33).

Based on the above structure, under normal running condition, the switching valve is under connecting condition, and then hydraulic pressure varying in accordance with driving state is applied to the hydraulic actuator (27). Under the above condition, the friction clutch (26) is engaged by certain engaging force and slippingly engaged based on frictional coefficient of road, wherein then torque is distributed to the front and rear wheels per certain distributing ratio. For example as snow roads and icy roads, frictional coefficient between the road and tire is small, so the clutch (26) is nearly direct coupling condition, and distributes torque to the front and rear wheels per certain distributing ratios. On the other hand, on road surface having high frictional coefficient such as dry paved roads, the clutch (26) slips to absorb rotational difference of the front and rear wheels. Furthermore, when garaging or tight-cornering, hydraulic pressure based on the line pressure to the actuator (27) is reduced, and the clutch (26) slips and absorbs large rotational difference of the front and rear wheels.

And, when the vehicle comes to certain high speed state, such as an overdrive condition, or comes to certain speed, such as more than 100 km/h, the sensors (S1) and (S2) detect the above condition, switch the switching valve (33), drain the hydraulic actuator (27), then release the friction clutch (26) intermittently or continuously. As a result, lubrication oil is applied between the friction plate and a separator, heat is released from the clutch (26) and temperature on the friction plates is lowered.

The numbers and marks shown in the parenthesis are to refer to the corresponding drawing(s), and there is no meaning to define structure of the present invention.

DETAILED DESCRIPTION OF THE PREFERRED EMBODIMENT

Figure 2:
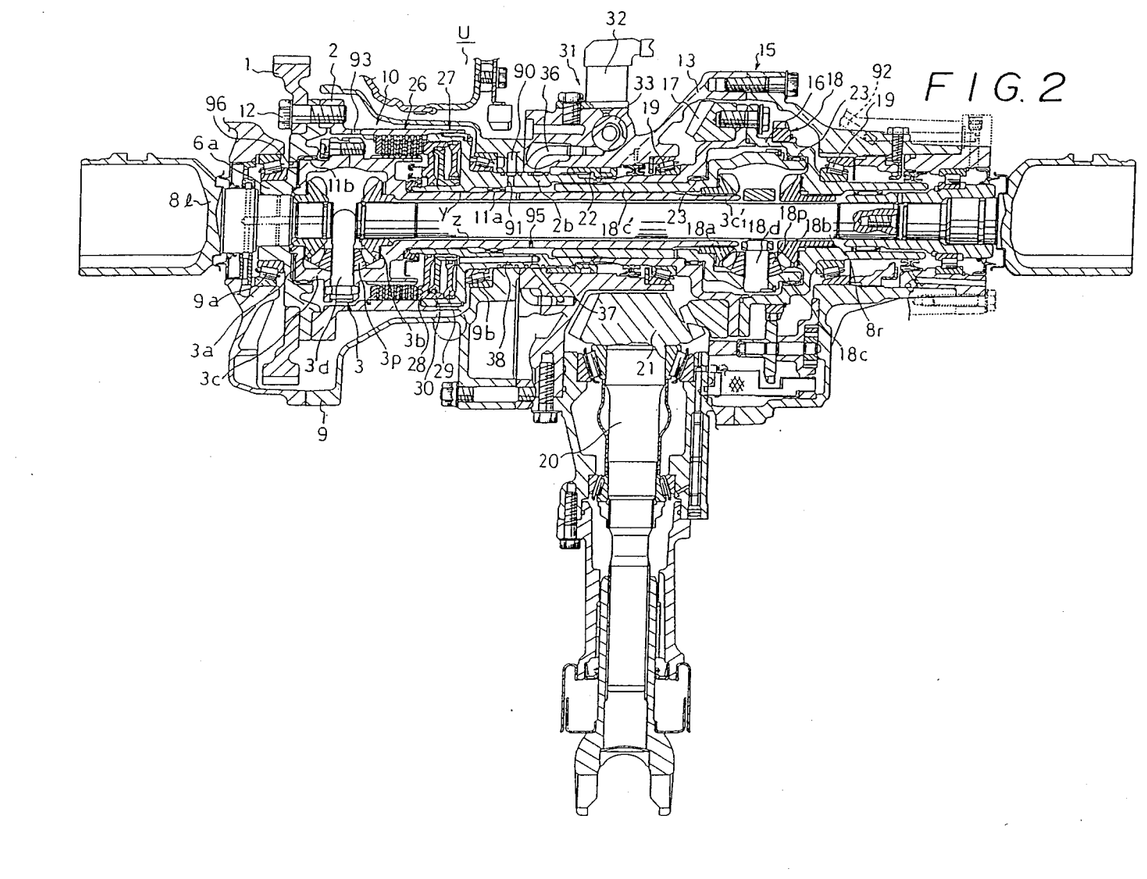
FIG. 2 is a cross sectional view of a power transmission for four wheel drive vehicle.

A power transmission for four wheel drive vehicle U with transverse front-engine and full-time system, as shown in FIG. 1 and FIG. 2, has an input gear 1 in which the power is transmitted from an engine (not shown) through a torque converter and an automatic transmission, and the gear 1 is fixed on a gear mounting case 2. The gear mounting case 2 is made up by separated cases, and fixed to the input gear 1 by a bolt 12. Further the case 2 is supported in a supporting case 9 by tapered roller bearings 9a, 9b, and the case 2 includes a front differential 3 and a differential limiting device 10. The front differential 3 has a front differential case 3c which is free rotationally supported by needle bearings 11a, 11b in the gear mounting case 2. The differential case 3c supports a pinion shaft 3d supporting a pinion 3p to constitute a carrier, and the case 3c supports right and left side gears 3a, 3b. The side gears 3a, 3b connect right and left front axles 8r, 8l.

At the right side of the gear mounting case 2, or the back side of the engine, a transfer case 13 is formed to be divided into right piece and left piece, and includes a transfer section 15 situated coaxially with the input gear mounting case 2 and the front differential 3. The transfer section 15 has a ring gear mounting case 16, and the ring gear mounting case 16 is capable of being divided into two separate pieces, and supports a ring gear 17 made up by a hpoide gear to drive rear wheels. And the case 16 is free rotationally supported by the transfer case 13 through a pair of tapered roller bearings 19, 19. The ring gear 17 meshes with a transfer driven gear 21 made up by a hypoid gear, and the gear 21 is made on the end of a pinion shaft 20. The driven pinion shaft 20 is connected to the right and the left rear axles through a known propeller shaft (not shown) and rear differential. The ring gear mounting case 16 includes a center differential 18, and the center differential 18 has a differential carrier 18c whose end is free. Further the differential carrier 18c is connected to a sleeve 2b which is extended from the input gear mounting case 2, and the opposite side of a connecting boss 18c' is free, while the differential carrier 18c is free rotationally supported by the ring gear mounting case 16 through needle bearings 23, 23. And the differential carrier 18c has a pinion shaft 18d to support the pinion 18p, the right side gear 18b is directly spline-coupled to the ring gear mounting case 16, and the left side gear 18a is connected to a differential case 3c of the front differential 3 through a sleeve 3c'1 which is inserted in the connecting boss 18c' and encloses the right front axle 8r.

A slide fitting 22 encloses slidingly and connects a sleeve 2b of the input gear mounting case 2 by a spline, and the slide fitting 22 constitutes a differential lock mechanism. The differential lock mechanism is operated by a lever (not shown), for switching "the lock position" engaging a spline made on a sleeve of the ring gear mounting case 16 (refer to upper side of FIG. 2) and "the unlock position" (refer to lower side of FIG. 2). The differential lock mechanism is unlocked in normal condition, however when the inspection is conducted by setting tires on the roller, the position is switched to the lock position, or further the differential lock mechanism is used in case of tires being caught in gutters and so on.

A differential motion limiting device 10, as covering the front differential 3, is installed in the input gear mounting case 2 which is disposed coaxially with the front differential 3. The differetial motion limiting device 10 has a wet type frictional multi-plate clutch 26 and a hydraulic actuator 27. In the clutch 26, separators are connected to the mounting case 2, and friction plates are connected to the differential case 3c. These separators and friction plates are controlled by the hydraulic actuator 27. The hydraulic actuator 27 has first piston 28 and second piston 29 which are oil-tightly contained in a cylinder made in the mounting case 2, and a reaction plate 30 which is oil-sealingly placed between the first and second pistons. The first piston 28 contacts an outer brim of the second piston 29, and the reaction plate 30 contacts the end of the cylinder, wherein these two pistons constitute "double piston". On the transfer case 13, a valve unit 31 for the differential limiting device 10 is installed. The control hydraulic pressure from the unit 31 is applied to a first chamber and a second chamber of the hydraulic actuator 27 through a pipe 36, oil passages 37 and 38.

On the other hand, a supply hole 90 for lubrication oil is made in the case 9, and the lubrication oil supplied from the hole 90 is applied to the needle bearings 11a, 23, 23 through a hole 91 made on the sleeve 2b. And the oil is drained from the draining hole 92 made on the case 13. oil led toward the front differential 3 through the needle bearing 11a is also led to, and stored in the gear mounting case 2 through a slit "y" made between the sleeve 2b and the sleeve of the differential case 3c, so the oil lubricates the wet-type frictional clutch 26 by oil-bathing lubrication, and is drained from a draining hole 93 made on the case 2. The needle bearing 11a constitutes an orifice by regulating the volume of lubrication oil per required condition, so the lubrication oil applied to the case 2 is controlled to certain volume. The lubrication oil applied to the area between the sleeve 3c'1 and the right axle shaft 8r from a hole 95 made on the sleeve 3c'1 is applied to the front differential case 3c through a thrust washer, then stored in the case 3c, and overflowed oil, after lubrication the thrust washer between the case 3c and the mounting case 2, is drained from a hole 96, and a part of the oil lubricates the needle bearing 11b and is drained from the hole 96.

Figure 3:
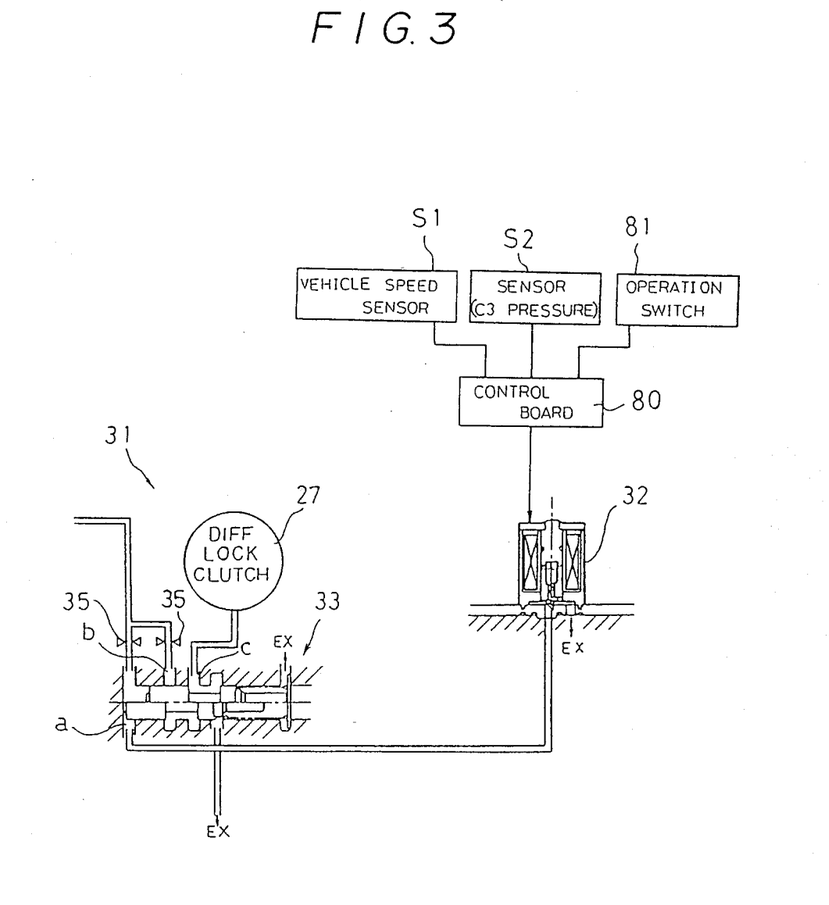
FIG. 3 is a hydraulic circuit view of a valve unit.

A valve unit 31, as shown in FIG. 3, has a solenoid valve 32 and a switching valve 33. The switching valve 33 has a port a connecting to a line pressure or regulator pressure reduced in accordance with the line pressure, and to the solenoid valve 32, a port b applying line pressure or regulator pressure, port c connecting to the hydraulic actuator 27, and a drain port EX. In FIG. 3, 35 is an orifice having certain diameter.

A connecting member 39, as shown in FIG. 1, meshing with a gear made on an outer surface of the ring gear mounting case 2 is installed in the supporting case 9. The conncecting member 39 is connected to a speedmeter through wires and so on. The speedmeter has a speed sensor S1, wherein the sensor sends signals to a control board 80 when a vehicle runs at certain speed, such as 100 km/h. The automatic transmission A has a sensor S2 which detects state of a hydraulic servo of clutch C3 released when overdrive running. The sensor S2 sends signals to the control board 80 to notify overdriving. Further, in the cab, a switch 81 releasing auto-mode of the differential motion limiting device 10 is installed, and the signals from the switch 81 is sent to the control board 80. And the control board 80 is connected to the solenoid valve 32 in the valve unit 31, wherein the solenoid valve 32 becomes ON or OFF by the signals from the sensors S1, S2 and the operation of the switch 81.

The operation of the present invention is explained as follows:

The engine rotation shifted to required speed in the automatic transmission is transmitted to the input gear mounting case 2 through the input gear 1. In normal running, the driver sets a shift lever to D range and selects auto-mode of the switch 81, the solenoid valve 32 of the valve unit 31 is ON condition, hydraulic pressure at the port a is drained, and the switching valve 33 becomes "lower-half-position" shown in FIG. 3. It may be possible to set the switching valve 33 drained when the solenoid 32 is OFF. Under this condition, the applying port b and the port c are connected, line pressure or regulator pressure reduced in accordance with the line pressure is applied to the first and second pistons 28, 29 through the pipe 36, and the oil passages 37, 38, and the clutch 26 is engaged by certain engaging force. Accordingly the center differential 18, its differential carrier 18c and the right side gear 18a are connected with certain engaging force, and the differential motion is limited by certain regulating force. Due to this motion, in case friction force between road surface and tires is smaller than the restriction force defined above, (for example: snow road, dart road) based on the engaging force of the clutch 26 the center differential 18 is under nearly direct coupling condition, wherein the rotation of the input gear mounting case 2 is transmitted to the differential case 3c of the front differential 3 through the center differential 18 which rotates together with the friction clutch 26, further transmitted to the right and left side gears 3a, 3b through the pinion 3p to drive the right and left front wheels, and transmitted to the pinion shaft 20 through the ring gear 17 fixed- on the center differential 18 and the gear 21. And the rotation is transmitted to the rear differential where torque is distributed, so that the right and left rear wheels are driven. In case that the friction force between road and tire is nearly balanced with the regulating force of the clutch 26, (for example: comparatively high speed running on the paved road) the clutch 26 is slidingly engaged so that slip of the tires is not developed. The center differential 18 absorbs rotational difference of the front and rear wheels and distributes torque to the front and rear wheels so that the torque distribution of the front and rear wheel nearly comes to 50:50.

Figure 4:
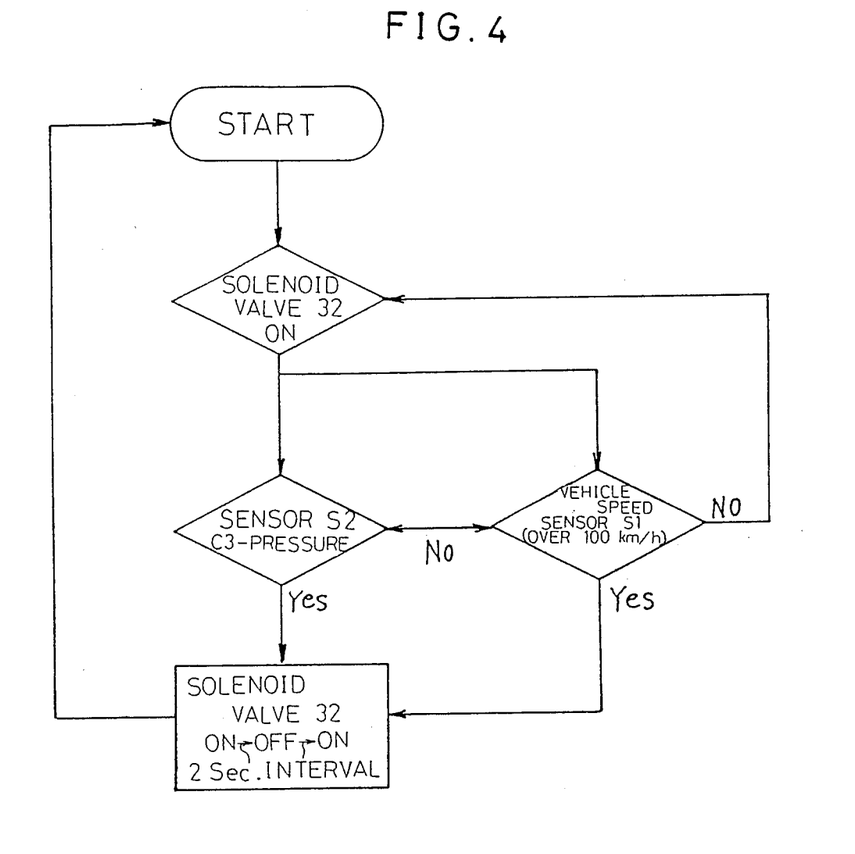
FIG. 4 is a sequence flow chart of the present invention.
Figure 5:
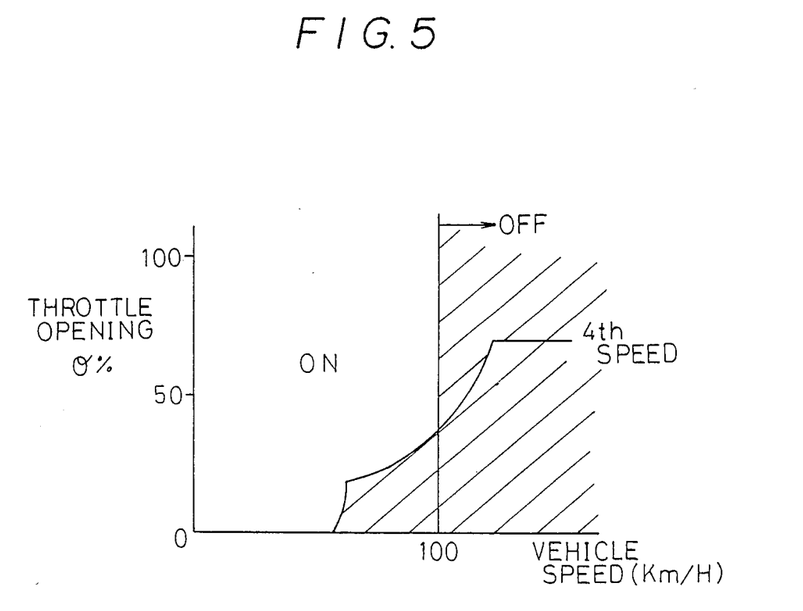
FIG. 5 is a view of working areas of the above sequence flow chart.

As shown in the flow chart of FIG. 4, under the condition that the vehicle is running on the paved road, when the automatic transmission A is shifted to overdrive state (maximum speed step) or vehicle speed comes to over 100 km/h, the sensor S2 or the sensor S1 detects and sends signal to FIG. 3 and the control board 80. (refer to FIG. 5) Then the solenoid valve 32 of the valve unit 31 receives ON and OFF signals every 2 seconds, that the switching valve 33 is switched alternatively between two positions as shown in the upper-half-position and lower-half-position in FIG. 3, and oil is repeatedly supplied to and released from the hydraulic 27. Due to the above, the wet-type frictional clutch 26 repeats engaging and releasing, wherein the lubrication oil stored in the case 2 is flowed into an area between the separators and friction plates. So the lubrication oil deprives the heat from separators and friction plates, and the oil is drained from the hole 93.

While in the case of turning sharp at low speed, such as garaging, rotational difference between the front and rear wheels is developed. However, at this time the throttle opening is small, so the regulator is low. As a result, the engaging force of the hydraulic actuator is small. Consequently the engaging force of the friction clutch 26 of the differential motion limiting device 10 is small, so the friction clutch 26 slips so that the relative rotation between the right and left side gears 18a, 18b of the center differential 18 is allowed. Then the center differential 18 comes under differential motion to prevent tight corner braking, and transmits torque to the front and rear wheels.

In case of running on the mountain roads having continuous sharp curves, the driver can set the valve unit 31 at off-position by one's own choice. Under this condition, the solenoid valve 32 is OFF, certain hydraulic pressure is applied to the port a of the switching valve 33, the valve 33 is switched to upper-half-position, and the port c is connected to the drain port EX. Then the hydraulic pressure to the actuator 27 is cut, and the friction clutch 26 is released. Then the rotation of the mounting case 2 is transmitted to the differential carrier 18c through the sleeve 2b, and further the rotation is transmitted to the right and left side gears 18a and 18b through the differential pinion. The rotation of the left side gear 18a is transmitted to the differential case 3c through the sleeve 3c'1, and further the rotation is transmitted to the right and left front axles 8r, 8l from the differential pinion 3p and through the right and left side gears 3a, 3b. On the other hand, the rotation of the right side gear 18b is transmitted to the gear mounting case 16 which is spline-coupled with the gear 18b, and transmitted to the pinion shaft 20 through the ring gear 17 and the gear 21, then to the right and left rear wheels through propeller shaft (not shown).

In the above embodiment, the first piston 28 and the second piston 29 are applied from one oil passage to be used simply as a power producing mechanism. However such structure that the oil is applied from respective oil passages to the piston 28 and 29 for precise slip-control is also practicable.

Along FIG. 6, an embodiment wherein a modulator pressure made by line pressure reduced proportionately is applied to the hydraulic actuator 27 is explained below.

Figure 6:
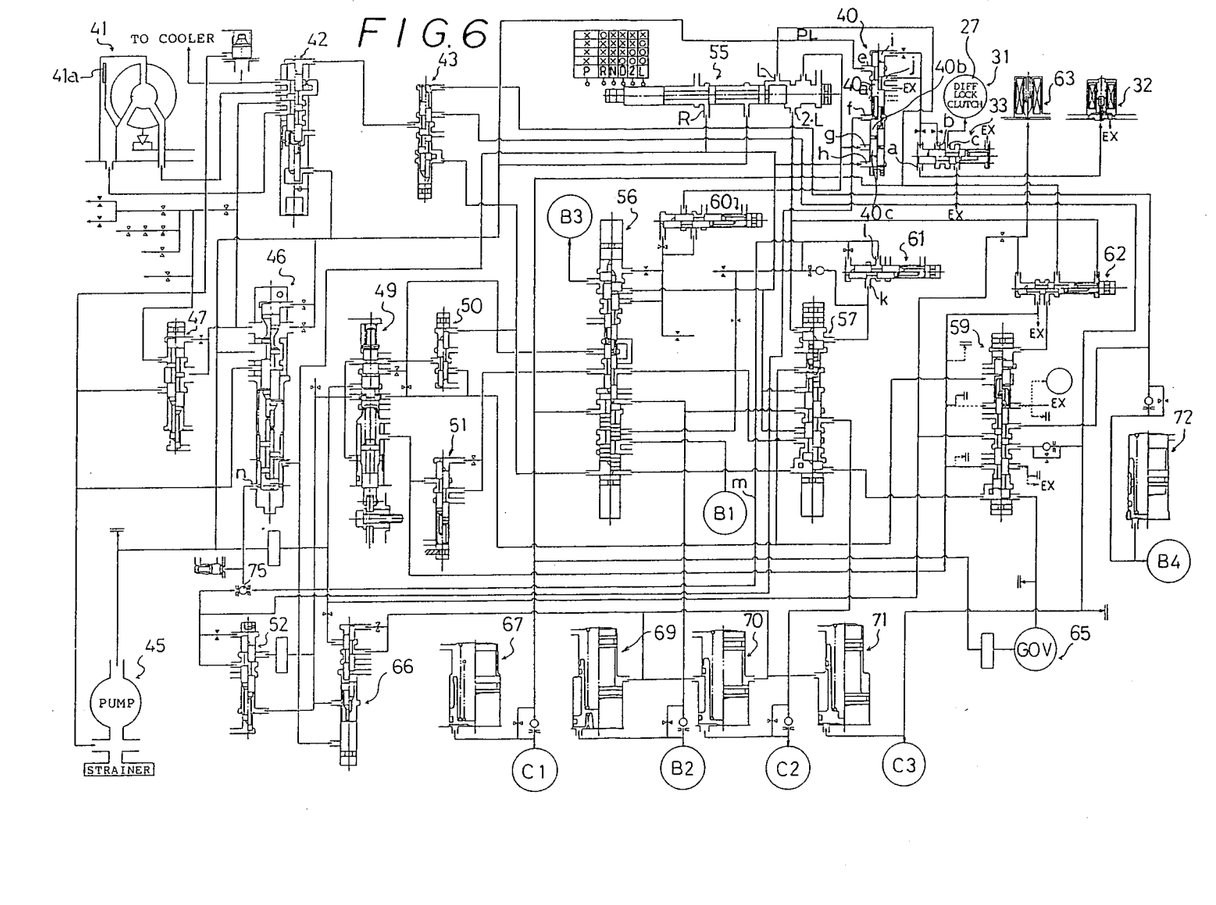
FIG. 6 is a view of hydraulic circuit of the present invention.

In FIG. 6, 31 is the valve unit having the switching valve 33 and the solenoid valve 32, and only the valve unit 31 is installed in the transfer section. The valves explained herein after are installed in the valve body of the automatic transmission. 40 is a regulator valve for the differential motion limiting device. 41 is a torque converter having a lock up clutch 41a. 42 is a lock up release valve, 43 and is a lock up signal valve. 45 is an oil pump, 46 is a primary regulator valve, 47 is a secondary regulator valve, and 49 is a throttle valve having a kick down valve. 50 is a cut back valve, 51 is a detent regulator valve, and 52 is a throttle modulator valve. 55 is a manual valve, 56 is a 1-2 shift valve, 57 is a 2-3 shift valve, and 59 is a 3-4 shift valve. 60 is a low coast modulator valve, 61 is a second coast modulator valve, 62 is a 3-4 switch valve, 63 is a solenoid valve to control the switch valve 62, and 65 is a governor valve. 66 is an accumulator control valve, 67 is a C1 accumulator, 69 is a B2 accumulator, 70 is a C2 accumulator, 71 is a C3 accumulator, and 72 is a B4 accumulator. And, hydraulic servos for C1, C2, C3, B1, B2, B3 and B4 are provided, wherein C1 is for a forward clutch, C2 is for a direct clutch, C3 is for an over drive direct clutch, B1 is for a second coast brake, B2 is for a second brake, B3 is for a first and reverse brake, and B4 is for an over drive brake.

The regulator valve 40 has a port e for line pressure, a port f for throttle pressure, a port g for L range line pressure, a port h for R range line pressure, a port i for feedback pressure, and regulating port j and drain port EX. And the valve 40 also has two plugs 40b and 40c having different cross sections.

Based on the above structure, in this embodiment, under the normal running, or the manual valve 55 is at D range, no oil is applied to the L range line pressure port e and R range line pressure port h on the valve 40. Under this condition, line pressure from the primary regulator valve 46 is applied to the port e of the valve 40, throttle pressure from the throttle valve 52 is applied to the port g, and further regulating pressure from the port j is applied to the feedback port i. As a result, the regulator valve 40 becomes right-half-position, the first and second plug 40b, 40c are still sit at the bottom, wherein to the bottom of regulating spool 40a, throttle pressure and pressing force of the spring are applied, and to the upper side of the regulating spool 40a, regulated pressure is applied. Due to this, the line pressure $P_L$ at the port e is reduced according to certain ration, and such reduced pressure is (regulator pressure) is applied from the port j to the switching valve 33 of the valve unit 31.

Figure 7:
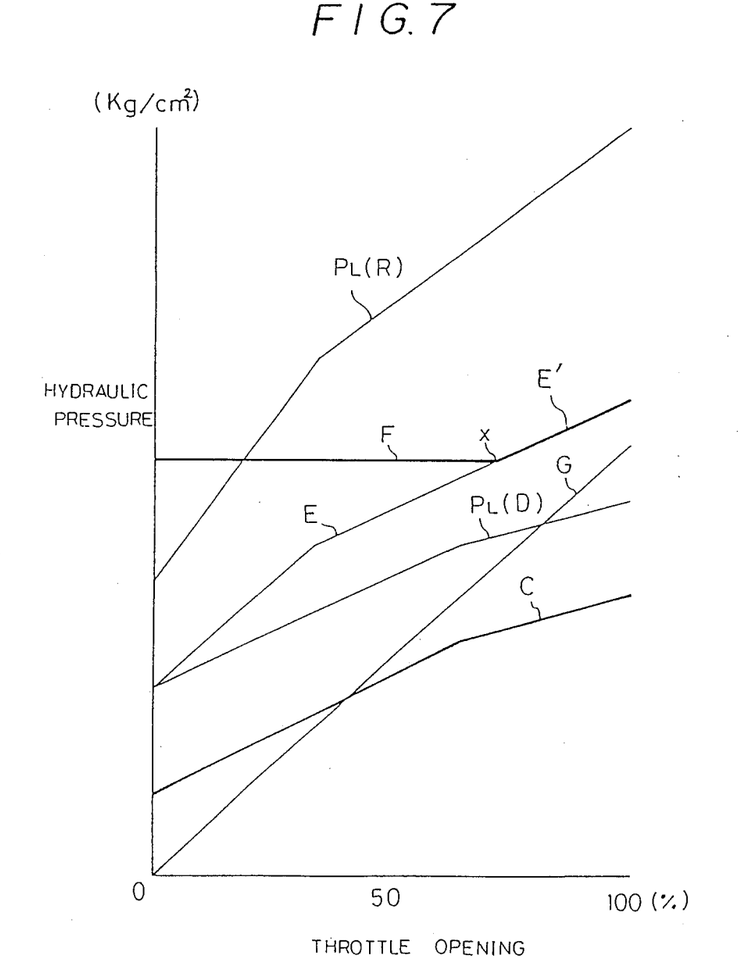
FIG. 7 is a view of hydraulic pressure changes by throttle opening.

Consequently, to the hydraulic actuator 27 of the differential motion limiting device 10, hydraulic pressure C (refer to FIG. 7) which is reduced proportional to the line pressure $P_L$ (D) in FIG. 7 is applied, and the clutch 26 is engaged by weak engaging force. As a result, differential motion regulating force by the center differential 18, or the pressing force capable of distributing torque to 50:50, becomes small, so rotational difference between the front and rear wheels is securely absorbed. Loss of fuel efficiency, wear of tires, and tight-corner-braking are eliminated.

In case one tire turns without load by being caught in a gutter and so on, the vehicle may not be recovered from an accidental state if above weak regulating force is still working. To prevent this, it is required to operate the manual valve 55 to L or R range.

When the manual valve is moved to R range, line pressure is applied from R port of the manual valve 55 to R range port h of the regulator valve 40. Under this condition, the regulator valve 40 becomes left-half-position, line pressure working to the bottom of the plug 40c overcomes the throttle pressure working to the upper side of the plug 40b and the feedback pressure (line pressure) working to the upper side of the spool 40a, then the line pressure moves the spool 40a with the plug 40b, 40c, and the port e and the port j are completely through. As a result, the high line pressure $P_L$ from the primary regulator valve 46 is applied to the port j of the valve 40 through the switching valve 33, and then the line pressure is applied to the hydraulic actuator 27 of the differential motion limiting device 10. The engaging force of the clutch 26 becomes large, and increases the regulating force of the center differential 18, so that the tire caught by the gutter is freed.

In case that a tire sticks and large slope climbing force is necessary, the manual valve 55 is shifted to L range. The line pressure from the L range port of the manual valve 55 is applied to the port g of the regulator valve 40. Under this condition, the lower side plug 40c sits at the bottom, the line pressure from the port g overcomes the feedback pressure working to the upper side of the spool 40a, and moves the spool 40a with the plug 40b, and then the port e and the port j are completely through.

At L range, the line pressure is applied from 2.L port of the manual valve 55 to the port k of the second coast modulator valve 61 through the 2-3 shift valve 57. The modulator valve 57 sets the spring so that the modulator pressure becomes high value, and the modulator pressure is applied from the port 1 to the port n of the primary regulator valve 46 through the oil passage "m" and the check ball 75. Due to the above, as shown in FIG. 7, under the condition that the throttle opening is small, the line pressure by the primary regulator valve 46, based on the modulator pressure set comparatively high, becomes nearly stable oil pressure F regardless of the throttle opening, and when the throttle opening exceeds certain amount x, the line pressure by the primary regulator valve 46 becomes oil pressure E' based on the throttle pressure to which no cut back pressure is applied.

Consequently, from the port j of the regulator valve 40, boosted line pressure is applied to the hydraulic actuator 27 through the switching valve 33, so the clutch 26 is engaged by comparatively large engaging force from the area where the throttle opening is small, and differential motion of the center differential 18 is regulated by large regulating force. In FIG. 7, G shows the throttle pressure.

In the above embodiment, the wet-type frictional clutch 26 working as torque distributing mechanism to both front and rear wheels is constituted as the differential motion limiting device 10 to regulate differential motion of the center differential 18, but it is also possible to be used for a multi-plate clutch on a power transmission device for four wheel drive vehicle which drives either front or rear wheel (for example; front wheel), and drives another wheel (rear wheel) through the wet-type frictional clutch. (refer to U.S. patent Ser. No. 948,218)

TECHNICAL ADVANTAGES

When the vehicle under high speed running condition which does not require four wheel driving state, the wet-type frictional clutch (26) is released by the sensors (S1), (S2) which detect certain high speed state such as shifting to the maximum speed and/or vehicle coming to certain speed, so that lubrucation oil is flowed between the separators and the friction plates to deprive the friction plates being heated by slip of heat. Accordingly heat resistance of the friction plates is enhanced, and it becomes possible to engage and slip the clutch (26) by comparatively weak engaging force for long time without incorporating expensive electronic devices. As a result, reliability on the power transmission device for four wheel drive vehicle distributing torque to front and rear wheels by applying oil pressure based on the line pressure constantly to the hydraulic actuator (27) is assured.

In particular, the differential motion limiting device (10) to regulate the differential motion of the center differential (18) is used as a torque distributing device, the torque is distributed to the front and rear wheels so that the distribution comes to certain ratio, the driver is not required a complicated operation, and the vehicle is under proper four wheel drive condition, furthermore, performance of acceleration, high speed running and stable driving are also enhanced. The frictional clutch (26) is only for regulating the center differential (18), so the clutch (26) is not required to have large capacity, such as for driving the rear wheels. Consequently, the clutch (26) can easily absorb rotational difference of the front and rear wheels in the case of high frictional coefficient, as paved roads. Moreover, based on the small torque capacity, when the throttle opening is small, hydraulic pressure to the actuator (27) is lowered, so tight-corner-braking is securely prevented.

We claim:

1. A power transmission device for four wheel drive vehicle adapted to transmit torque from a transmission to front and rear wheels, comprising:
   a torque distribution control device connected to the transmission and indirectly to the front and rear wheels, said torque distribution control device including a wet-type frictional clutch for controlling torque distribution to the front and rear wheels, and a hydraulic actuator for operating the frictional clutch,
   a switching valve hydraulically connected to the hydraulic actuator for supplying predetermined hydraulic pressure to the hydraulic actuator or draining hydraulic pressure in the actuator,
   a sensor for sensing running condition of the vehicle, and
   a control unit connected to the sensor and the switching valve for controlling the switching valve based on signal from the sensor, said control unit, when the sensor senses a predetermined high speed running condition, operating the switching valve for a predetermined time so that hydraulic pressure in the hydraulic actuator is reduced at least for a predetermined time to release engagement of the frictional clutch, and when the sensor senses a predetermined speed running condition, said control unit operating the switching valve to supply hydraulic pressure regulated at a predetermined pressure to the hydraulic actuator so that the frictional clutch is actuated at a predetermined pressure to distribute torque to the front and rear wheels at a predetermined rate.

2. A power transmission device according to claim 1, wherein said transmission is an automatic transmission, and pressure of hydraulic pressure supplied to the hydraulic actuator is based on line pressure of the automatic transmission.

3. A power transmission device according to claim 1, wherein said sensor detects shifting of the transmission.

4. A power transmission device according to claim 1, wherein said sensor detects speed of the vehicle.

5. A power transmission device for four wheel drive vehicle having a center differential device for transmitting torque from a transmission to front and rear wheels, comprising:
   a differential limiting device for controlling torque distribution to the front and rear wheels by limiting the center differential device, said differential limiting device having a wet-type frictional clutch and a hydraulic actuator for operating the frictional clutch,
   a switching valve hydraulically connected to the hydraulic actuator for supplying predetermined hydraulic pressure to the hydraulic actuator or draining hydraulic pressure in the actuator,
   a sensor for sensing running condition of the vehicle, and
   a control unit connected to the sensor and the switching valve for controlling the switching valve based on signal from the sensor, said control unit, when the sensor senses a predetermined high speed running condition, operating the switching valve for a predetermined time so that hydraulic pressure in the hydraulic actuator is reduced at least for a predetermined time to release engagement of the frictional clutch, and when the sensor senses a predetermined speed running condition, said control unit operating the switching valve to supply hydraulic pressure regulated at a predetermined pressure to the hydraulic actuator so that the frictional clutch is actuated at a predetermined pressure to distribute torque to the front and rear wheels at a predetermined rate.

6. A power transmission device according to claim 5, wherein said transmission is an automatic transmission, and the hydraulic pressure supplied to the hydraulic actuator is based on line pressure of the automatic transmission.

7. A power transmission device according to claim 5, wherein said sensor detects shifting of the transmission.

8. A power transmission device according to claim 5, wherein said sensor detects speed of the vehicle.

9. A power transmission device according to claim 5, further comprising a gear mounting case situated between the transmission and the center differential device, and a front differential case connected to the center differential device, said frictional clutch being situated between the gear mounting case and the front differential case.

* * * * *